United States Patent [19]

Thirion deBriel

[11] Patent Number: 4,608,030

[45] Date of Patent: Aug. 26, 1986

[54] CENTRIFUGALLY OPERATED VARIABLE SPEED DRIVE PULLEY

[75] Inventor: Jacques Thirion deBriel, Levallois-Perret, France

[73] Assignee: Valeo, Paris, France

[21] Appl. No.: 686,485

[22] Filed: Dec. 26, 1984

[30] Foreign Application Priority Data

Dec. 28, 1983 [FR] France ................................ 83 20939

[51] Int. Cl.[4] ...................... F16H 55/56; F16H 11/06
[52] U.S. Cl. ........................................ 474/13; 474/14
[58] Field of Search ............................... 474/11–16, 474/28, 43, 46, 94

[56] References Cited

U.S. PATENT DOCUMENTS

| | | | |
|---|---|---|---|
| 2,973,655 | 3/1961 | Rix | 474/46 |
| 3,174,348 | 3/1965 | Luenberger | 474/43 |
| 4,178,808 | 12/1979 | Bacher | 474/13 |
| 4,432,743 | 2/1984 | Pitoiset | 474/14 |

FOREIGN PATENT DOCUMENTS 2516622 5/1983 France .
2546257 11/1984 France .

Primary Examiner—Stephen J. Novosad
Assistant Examiner—Thuy M. Bui
Attorney, Agent, or Firm—Charles E. Brown; Charles A. Brown

[57] ABSTRACT

A centrifugally operated variable speed drive pulley comprises a hub aligned with a rotation axis. Two annular flanges around the hub in face-to-face relationship receive a transmission belt. At least one of these flanges is able to slide along the hub. A transverse bearing member is mounted on the hub and a diaphragm spring is disposed between the mobile flange and the transverse bearing member. The diaphragm spring is able to flex in such a way as to control sliding movement of the mobile flange along the hub. A plurality of flyweights are carried by the diaphragm spring. The flyweights are at least partially embedded in a mass of molded material applied to the diaphragm spring.

16 Claims, 14 Drawing Figures

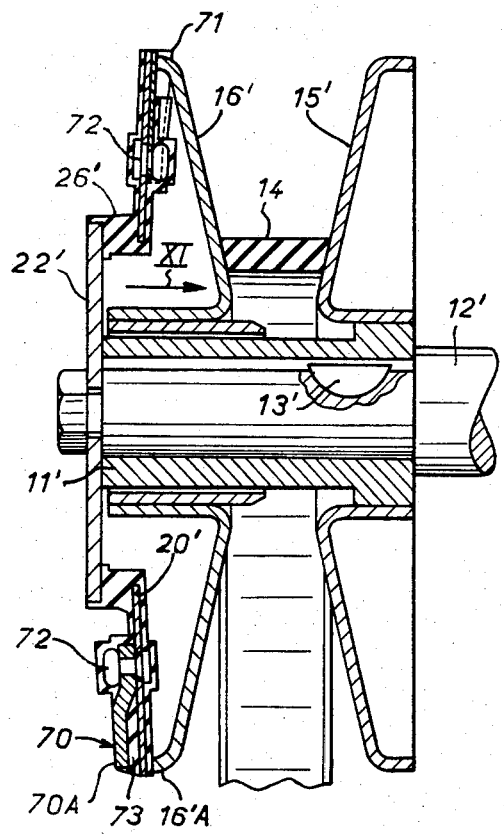
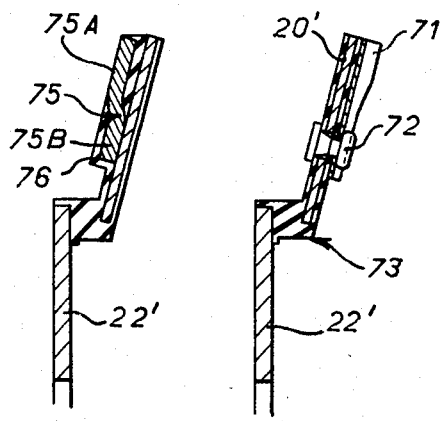
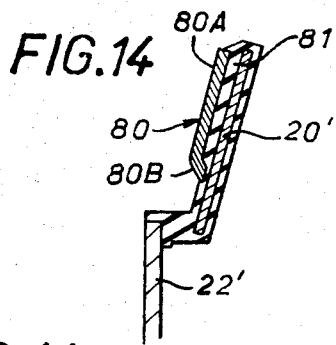
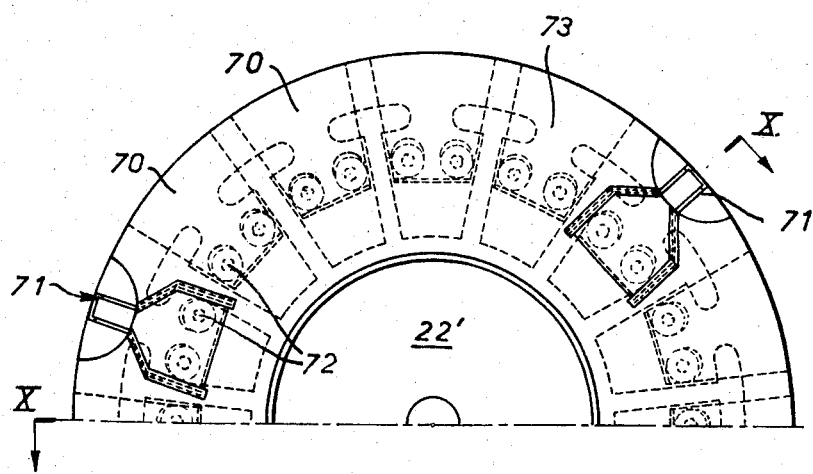

4,608,030

CENTRIFUGALLY OPERATED VARIABLE SPEED DRIVE PULLEY

BACKGROUND OF THE INVENTION

1. Field of the Invention

The present invention concerns centrifugally operated variable speed drive pulleys of the kind comprising a hub constrained to rotate with a shaft and, around the former, in face-to-face relationship and adapted to receive a transmission belt, two annular flanges at least one of which, hereinafter referred to as the mobile flange, slides along the hub under the control of a diaphragm spring carrying flyweights. In the conventional manner this diaphragm spring is constituted by a peripheral part forming a Belleville spring, bearing against the mobile flange in such a way that it is able to flex, and a central part divided into fingers bearing on a transverse bearing member mounted on the hub, likewise in such a manner as to be able to flex. Pulleys of this kind are used in particular to drive automobile vehicle ancillary equipments from the motor.

2. Description of the Prior Art

Pulleys of this type are described in particular in French Pat. No. 2 516 622, filed Nov. 18, 1981.

As is well known, a diaphragm spring is a frustoconical annular spring, the cone angle of which varies as a function of the torque exerted on it in diametral axial planes. The presence of flyweights attached to the diaphragm spring is intended to apply to the latter a torque which varies with the rotation speed of the pulley so as consequently to modify the distance between the two annular flanges of the latter by varying the axial loads applied to the mobile flange and thus to the belt. In the conventional manner these flyweights, which are generally massive in form, have their center of gravity as far removed as possible from the diaphragm spring in order to exert on the latter as high a torque as possible for a given flyweight mass.

One effect of this overhang is the creation of very high stresses in the areas where the flyweights are fixed to the diaphragm spring, whence the risk of rupture and thus of an accident arising out of the projection of the flyweights thus detached from the diaphragm spring as if thrown from a sling.

SUMMARY OF THE INVENTION

The invention is intended to alleviate these disadvantages and to this end consists in a centrifugally operated variable speed drive pulley comprising a hub aligned with a rotation axis, two annular flanges around said hub in face-to-face relationship and adapted to receive a transmission belt, at least one of said flanges being a mobile flange adapted to slide along said hub, a transverse bearing member mounted on said hub, a diaphragm spring disposed between said mobile flange and said transverse bearing member in the axial sense, adapted to flex in such a way as to control sliding movement of said mobile flange along said hub, a plurality of flyweights carried by said diaphragm spring, and a mass of molded material applied to said diaphragm spring in which said flyweights are at least partially embedded.

This mass of molded material is advantageously elastic, preferably an elastomer and applied to the diaphragm spring, for example, by vulcanization in situ or by bonding. This mass of molded elastic material advantageously covers the diaphragm spring at least partially so as, on the one hand, to improve its attachment to the diaphragm spring and, on the other hand, to reduce or even prevent the passage of dirt through the diaphragm spring by virtue of the slots by means of which the fingers of the latter are usually separated. It will be noted that this latter advantageous characteristic of the invention is of itself known from French patent application No. 83 08047, from which U.S. application Ser. No. 610,512 filed May 12, 1984, claims priority and which French application published as French printed patent application 2,546,257. However, this latter application does not feature flyweights attached to the diaphragm spring.

Where the diaphragm spring is coupled to the mobile flange and/or to the transverse bearing member by an elastomer spacer, the invention provides in particular that this spacer should be incorporated in the mass in which the flyweights are embedded.

it is to be noted that, by virtue of this embedding of the flyweights, the invention provides for the latter to be fixed to the diaphragm spring not directly but rather through the intermediary of the surrounding mass.

The flyweights are preferably of sheet metal and are advantageously for the most part parallel to the diaphragm spring.

Other objects and advantageous will appear from the following description of examples of the invention, when considered in connection with the accompanying drawings, and the novel features will be particularly pointed out in the appended claims.

BRIEF DESCRIPTION OF THE DRAWINGS

FIG. 10 is an axial cross-section on the line X—X in FIG. 11 of a driven variable speed drive pulley in accordance with the invention.

FIG. 11 is a partial axial half-view of it in the direction of the arrow XI in FIG. 10.

FIGS. 12 through 14 are half-views in axial cross-section of diaphragm springs in variants of the embodiment of FIG. 11.

DESCRIPTION OF THE PREFERRED EMBODIMENTS

Figure 1:
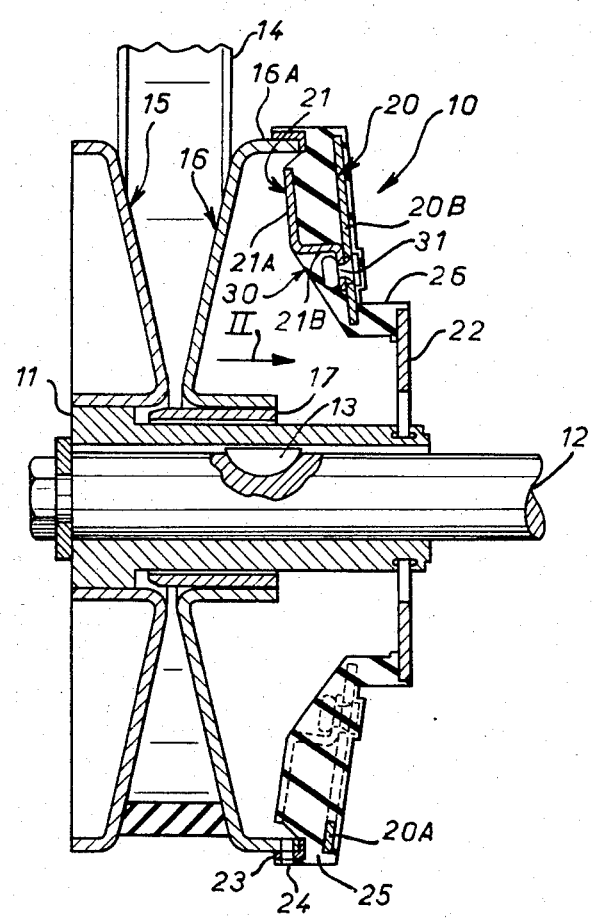
FIG. 1 is an axial cross-section on the line I—I in FIG. 2 of a driving variable speed drive pulley in accordance with the invention.

FIG. 1 shows a variable speed drive pulley 10 comprising a hub 11 constrained to rotate with a shaft 12 by a key 13 and two annular flanges 15 and 16 around the hub 11 in face-to-face relationship adapted to receive a transmission belt 14. At least one of the flanges, denoted 16 in FIG. 1, hereinafter referred to as the mobile flange, slides along the hub by virtue of a bush 17 and under the control of a diaphragm spring 20 carrying flyweights 21 and interposed axially through annular flexing support areas of different radii between a cylindrical projection or axial ring 16A of the mobile flange and a transverse bearing member 22 fastened to the hub 11.

In the conventional manner, but not mandatorily, as disclosed in the aforementioned French patent application No. 81 21590, the diaphragm spring 20 is coupled to the mobile flange 15 through the intermediary of an annular angle bracket 23 fastened to said flange 15 by pegs 24, for example, and linked to it by an annular elastomer spacer 25. Likewise in the conventional manner, but not mandatorily, this diaphragm spring is coupled to the transverse bearing member 22 by another annular elastomer spacer 26, of smaller radius than the aforementioned spacer 25.

In accordance with the invention, the flyweights 21 are at least partially embedded in a mass 30 of molded material applied to the diaphragm spring.

In accordance with advantageous but not mandatory characteristics of the invention the mass 30 of molded material of the pulley shown by way of example in FIG. 1 is a mass of elastomer, vulcanized in situ, for example, which surrounds the aforementioned annular spacers 25 and 26 and which further extends at least in part (completely in the example shown) over the diaphragm spring 20.

In the conventional manner the diaphragm spring 20 comprises a peripheral part 20A forming a Bellville spring and a central part divided into radial fingers 20B separated by slots 20C. These slots are advantageously closed off by the mass 30 of molded material.

In accordance with one advantagous characteristic of the invention, the flyweights 21 are sheet metal members. As shown they each comprise a plane part 21A, preferably parallel to the diaphragm spring, extended by a lug 21B for fastening it to the diaphragm spring, by means of rivets 31, for example. The latter are also for preference surrounded by the mass 30.

Figure 2:
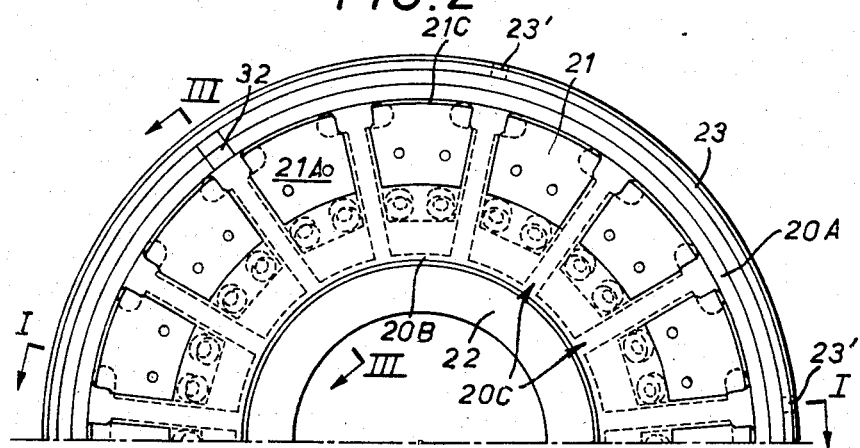
FIG. 2 is a partial axial half-view of it in the direction of the arrow II in FIG. 1.

It will be noted that the flyweights are in an advantageous manner not covered by the mass 30 on their side opposite the diaphragm spring (see FIG. 2); it is through these surfaces as well as, where appropriate, through the outside edges 21C of the flyweights that the preformed flyweight-diaphragm spring combination is generally retained in position relative to the angle bracket 23 and/or the transverse bearing member 22 during molding of the mass 30.

Figure 3:
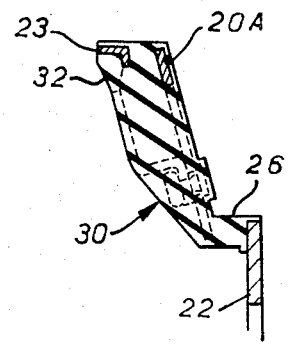
FIG. 3 is a partial half-view of it in axial cross-section on the line III—III in FIG. 2.

As shown in FIG. 12, the angle bracket 23 features a plurality of radial holes 23' adapted to receive pegs 24 for coupling it to the mobile flange. In order to facilitate the alignment of these holes 23' with the corresponding holes in the cylindrical extension 16A of the mobile flange, the mass 30 of molded material in which the flyweights are anchored features an annular positioning index 32 (see FIG. 3) adapted to cooperate with an axial notch (not shown) formed in said extension 16A.

It will be noted that the thickness of the mass 30 varies progressively, in a quasi-linear fashion, between the plane portion 21A of the flyweights and the ends of the fingers 20B of the diaphragm spring.

Figure 4:
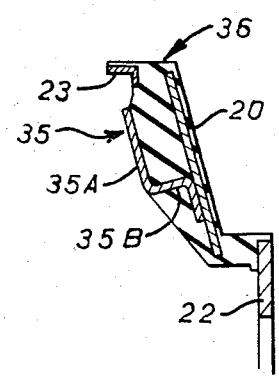
FIGS. 4 through 9 are views analogous to FIG. 3 corresponding to alternative embodiments of the flyweights and the molded material.

In the alternative embodiment shown in FIG. 4, the diaphragm spring 20 carries flyweights 35 which are not fixed to it directly. These flyweights are formed, as previously, by sheet metal members comprising a plane portion 35A parallel to the diaphragm spring and a fixing lug 35B in contact with the diaphragm spring, but these lugs are not fixed to the diaphragm spring; they ensure an indirect fastening of the flyweights to the diaphragm spring by virtue of being anchored in the mass 36 of elastomer material in which the major part of the flyweights is embedded.

FIGS. 5 through 9 show various configurations of flyweights attached without direct contact to a diaphragm spring 20. As shown these flyweights, fabricated from sheet metal, essentially comprise a plane portion parallel to the diaphragm spring, where appropriate extended by one or more folded back edges anchored into a surrounding mass in order to improve the resistance to tearing of the flyweights away from the elastomer.

Figure 5:
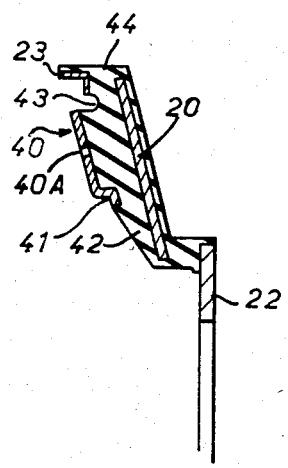

Thus FIG. 5 shows a flyweight 40 extended in the direction towards the inside periphery of the diaphragm spring by a double zigzag fold 41 flush with the surface of the surrounding mass 42. This flyweight-diaphragm spring combination also differs from those of FIGS. 3 and 4 in that an annular groove 43 is formed between the flyweights 40 and the angle bracket 23 in order to facilitate flexing, with variation in its cone angle, of the diaphragm spring 20 relative to its bearing engagement on the angle bracket 23 and also to maintain as constant as possible the stiffness of the latter. In a variant, this groove 43 is extended as far as the diaphragm spring and the annular spacer 44 disposed axially between the angle bracket and the diaphragm spring is independent of the surrounding mass 42, or even fabricated from a different material.

The flyweight 40 comprises in its plane part two orifices 40A by virtue of which it is advantageously positioned by means of appropriate pegs (not shown) relative to the mold and thus to the diaphragm spring, to the angle bracket 23 and to the transverse bearing member 22 during the molding of the mass 42. In a variant, the flyweights are positioned by one of their edges, in combination with a single orifice 40A, or with another edge. During this operation the diaphragm spring is advantageously positioned by means of fingers (not shown) which subsequently leave their trace in the mass 42. In a variant, this orifice 40A serves as a trap for the surrounding mass, which fills it, or receives an anchoring peg which is distinct from the flyweight.

Figure 6:
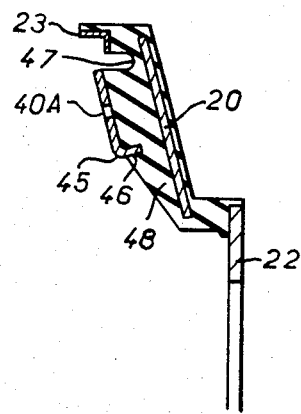

FIG. 6 shows a combination analogous to that of FIG. 5, but with a flyweight 45 which features a single fold 46 for anchoring it in the mass 48. It will also be noted that this flyweight is separated from the angle bracket 23 by a groove 47 which is extended as far as the diaphragm spring.

Figure 7:
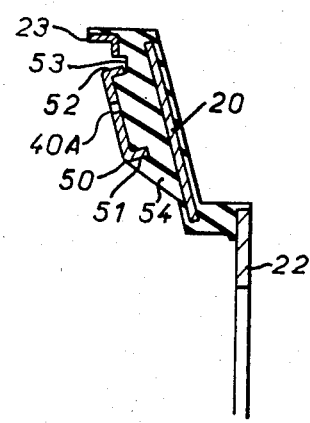

FIG. 7 shows a combination analogous to that of FIG. 6, comprising a flyweight 50 featuring two simple folds 51 and 52, respectively directed radially inwards and radially outwards. This flyweight 50 is separated from the angle bracket 23 by an annular groove 53 delimited in part by the outward fold 52. It will be noted that radially inwards of the flyweights 50 the thickness of the surrounding mass 54 features a progressive variation and then becomes constant at the internal periphery of the diaphragm spring.

Figure 8:
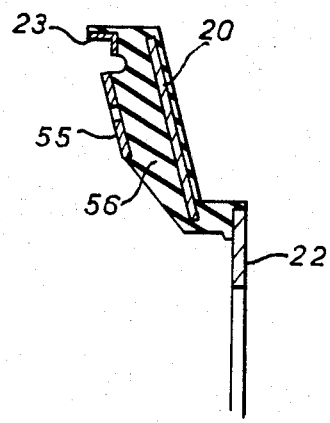
Figure 9:
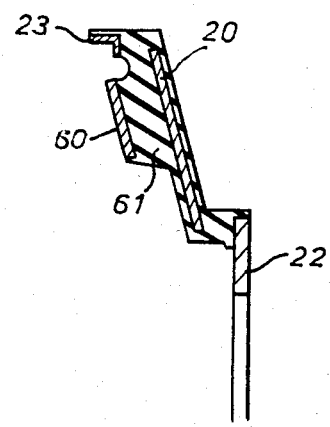

FIGS. 8 and 9 show plane flyweights 55 and 60 which do not feature any anchoring folds and which are coupled to the diaphragm spring through adhesion of the surrounding mass 56 or 61 to their surface facing the diaphragm spring 20. The surrounding mass 56 varies continuously in thickness up to the internal periphery of the diaphragm spring, whereas the surrounding mass 61 features a sudden variation in thickness; this requires a smaller quantity of material than in the case of FIG. 8, but there is then the risk of peeling occurring at 62 in the vicinity of the diaphragm spring at the root of this sudden variation of thickness. Nevertheless, this solution is satisfactory provided that the forces generated centrifugally remain moderate.

FIG. 10 shows a pulley 10' analogous to the pulley 10 of FIG. 1 except that the diaphragm spring 20' has flyweights 70 on its surface opposite the mobile flange 16'.

In a pulley of this kind, conventionally referred to as a driven pulley, the mobile flange 16' tends to move towards the fixed flange 15' when their rotation speed increases.

In the conventional manner the diaphragm spring 20' is coupled to the mobile flange 16' in rotation only, and not axially, since it operates by thrusting on the mobile flange, unlike the diaphragm spring 20 of FIG. 1, centrifugal force tending to reinforce this thrust by virtue of the action of the flyweights.

In this instance rotational coupling is achieved by members 71, also of sheet metal, the lateral edges of which are folded axially so as to be able to cooperate with the axial flanks of notches formed to this effect in the cylindrical axial extension 10'A of the mobile flange.

As shown in FIGS. 10 and 11 the flyweights 70 and the rotational coupling members 71 are mounted on opposite sides of the diaphragm spring 20', to which they are fixed by rivets 72, two for each part. Flyweights 70 and members 71 together with their rivets are embedded in a mass 73 of molded material, an elastomer in this instance, which surrounds the annular spacer 26' linking the diaphragm spring 20' to the transverse bearing member 22'.

It will be noted that the flyweights 70, which are fabricated in sheet metal, as previously, comprise a plane part 70A which in much nearer the diaphragm spring 20' than in the case illustrated by FIGS. 1 through 9.

It will likewise be noted that the radially outermost portions of the rotational coupling member 71 are not coated since it is advantageously through these that the diaphragm spring-flyweight-members assembly is held in position when molding the mass 73 of material.

FIG. 13 shows a variant in which the members 71 are not embedded, having been attached to the diaphragm spring 20' after molding the mass 73.

FIGS. 12 and 14 represent variants in which the flyweights are fixed to the diaphragm spring only through the intermediary of the surrounding mass. FIG. 12 shows a flyweight 75 comprising a plane portion 75A parallel to the diaphragm spring and flush with the surface of the surrounding mass 76, as well as a double zigzag fold 75B anchored in this mass, and coming into contact with the diaphragm spring. On the other hand, FIG. 14 shows a flyweight 80 comprising a plane portion 80A and a fold 80B, both flush with the surface of the surrounding mass 81.

The rivets 72 preferably pass through the fingers of the diaphragm spring by means of radially elongate holes providing for adjustment of the position of the diaphragm spring and the flyweights relative to the coupling members. The members 71 are advantageously centered relative to the bearing member 22' by means of holes, also radially elongate, through which the rivets 72 pass.

It will be understood that various changes in the details, materials and arrangements of parts which have been herein described and illustrated in order to explain the nature of the invention may be made by those skilled in the art within the principle and scope of the invention as expressed in the appended claims.

This applies in particular to the shape of the flyweights and of the mass of material in which they are embedded. It will be noted that the molded material in which the flyweights are embedded, an elastomer in the examples described, is preferably elastic, in particular to damp any vibrations passing through the diaphragm spring and which could in the long term result in detachment of the flyweights and also reduce adhesion of this mass to the latter.

I claim:

1. Centrifugally operated variable speed drive pulley comprising:
    a hub aligned with a rotation axis,
    two annular flanges around said hub in face-to-face relationship and adapted to receive a transmission belt, at least one of said flanges being a mobile flange adapted to slide along said hub,
    a transverse bearing member mounted on said hub,
    a diaphragm spring disposed between said mobile flange and said transverse bearing member in the axial sense, adapted to flex in such a way as to control sliding movement of said mobile flange along said hub,
    a plurality of flyweights carried by said diaphragm spring, and
    a mass of molded material applied to said diaphragm spring in which said flyweights are at least partially embedded.

2. Pulley according to claim 1, wherein said molded material is an elastic material and at least partially covers said diaphragm spring.

3. Pulley according to claim 1, wherein said flyweights are coated by a mass of elastomer material.

4. Pulley according to claim 3, further comprising an annular spacer constituting part of said mass of molded material and whereby said diaphragm spring is coupled to said mobile flange.

5. Pulley according to claim 4, further comprising an annular groove formed in said mass of molded material between said flyweights and said annular spacer.

6. Pulley according to claim 4, wherein said mass of molded material incorporates an index whereby it is angularly positioned between said diaphragm spring and said mobile flange.

7. Pulley according to claim 3, further comprising an annular spacer constituting part of said mass of molded material and coupling said diaphragm spring to said transverse bearing member.

8. Pulley according to claim 1, further comprising sheet metal members at least partially embedded in said mass of molded material and wherein said flyweights are on the opposite side of said mobile flange relative to said diaphragm spring which is rotationally coupled to said mobile flange by said sheet metal members.

9. Pulley according to claim 1, wherein said flyweights are indirectly attached to said diaphragm spring through the intermediary of said mass of molded material.

10. Pulley according to claim 9, wherein said flyweights are separate from said diaphragm spring.

11. Pulley according to claim 1, wherein said flyweights are of sheet metal.

12. Pulley according to claim 11, wherein said flyweights comprise a plane part parallel to said diaphragm spring.

13. Pulley according to claim 12, wherein said plane part is flush with the surface of said mass of molded material.

14. Pulley according to claim 12, wherein said flyweights incorporate folded over portions whereby they are anchored in said mass of molded material.

15. Pulley according to claim 12, wherein there is at least one orifice in said plane part of said flyweights.

16. Pulley according to claim 1, wherein the thickness of said mass of molded material varies progressively.

* * * * *